US 8,587,615 B2

(12) United States Patent
Kim et al.

(10) Patent No.: US 8,587,615 B2
(45) Date of Patent: Nov. 19, 2013

(54) METHOD, SYSTEM, AND COMPUTER-READABLE RECORDING MEDIUM FOR PROVIDING INFORMATION ON AN OBJECT USING VIEWING FRUSTUMS

(75) Inventors: Tae Hoon Kim, Gyeonggi-do (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/378,400

(22) PCT Filed: Dec. 23, 2010

(86) PCT No.: PCT/KR2010/009278
§ 371 (c)(1),
(2), (4) Date: Dec. 15, 2011

(87) PCT Pub. No.: WO2011/083929
PCT Pub. Date: Jul. 14, 2011

(65) Prior Publication Data
US 2012/0162258 A1    Jun. 28, 2012

(30) Foreign Application Priority Data
Jan. 11, 2010 (KR) ........................ 10-2010-0002340

(51) Int. Cl.
*G09G 5/377* (2006.01)
(52) U.S. Cl.
USPC ........... 345/633; 345/629; 345/630; 345/631; 345/632; 715/848; 715/849; 715/850; 382/103; 382/113; 382/224; 382/282

(58) Field of Classification Search
USPC ........... 345/629–641; 715/848–850; 382/103, 382/113, 224, 282
See application file for complete search history.

(56) References Cited

U.S. PATENT DOCUMENTS

| 6,018,348 | A | 1/2000 | Sprague |
| 7,583,275 | B2* | 9/2009 | Neumann et al. ............. 345/633 |
| 2004/0105573 | A1* | 6/2004 | Neumann et al. ............. 382/103 |
| 2005/0024388 | A1* | 2/2005 | Takemoto ..................... 345/633 |
| 2006/0195858 | A1 | 8/2006 | Takahashi |
| 2006/0203012 | A1* | 9/2006 | Nakajima ..................... 345/629 |
| 2007/0279412 | A1* | 12/2007 | Davidson et al. ............. 345/419 |
| 2008/0140638 | A1 | 6/2008 | Bruno |
| 2009/0092277 | A1* | 4/2009 | Ofek et al. .................... 382/100 |
| 2010/0007582 | A1* | 1/2010 | Zalewski .......................... 345/8 |
| 2010/0033503 | A1* | 2/2010 | Baar et al. ..................... 345/647 |
| 2010/0121866 | A1* | 5/2010 | Bell et al. ...................... 707/758 |
| 2010/0306707 | A1 | 12/2010 | Caduff |
| 2011/0090149 | A1* | 4/2011 | Larsen et al. ................. 345/158 |

FOREIGN PATENT DOCUMENTS

JP    2004-147143    5/2004

* cited by examiner

*Primary Examiner* — Xiao M. Wu
*Assistant Examiner* — Todd Buttram
(74) *Attorney, Agent, or Firm* — Blakely, Sokoloff, Taylor & Zafman LLP

(57) ABSTRACT

The present invention relates to a method for providing information on an object by using viewing frustums. The method includes the steps of: (a) specifying at least two viewing frustums whose vertexes are visual points of respective user terminals; and (b) calculating a degree of interest in the object by referring to the object commonly included in both a first viewing frustum whose vertex is a visual point of a first user terminal and a second one whose vertex is a visual point of a second user terminal.

33 Claims, 4 Drawing Sheets

METHOD, SYSTEM, AND COMPUTER-READABLE RECORDING MEDIUM FOR PROVIDING INFORMATION ON AN OBJECT USING VIEWING FRUSTUMS

CROSS REFERENCE TO RELATED APPLICATIONS

This application is a U.S. National Phase Application of International Application PCT Application No. PCT/KR2010/009278 filed on Dec. 23, 2010, which claims the benefit of priority from Korean Patent Application No. 10-2010-0002340 filed on Jan. 11, 2010. The disclosures of International Application PCT Application No. PCT/KR2010/009278 and Korean Patent Application No. 10-2010-0002340 are incorporated herein by reference.

FIELD OF THE INVENTION

The present invention relates to a method, a system and a computer-readable recording medium for providing information on an object by using viewing frustums; and more particularly, to the method, the system and the computer-readable recording medium for effectively providing other users with additional information on the object in which users are much interested by automatically calculating a degree of interest in the object with reference to respective viewing frustums whose vertexes are visual points of respective user terminals if images are taken by the user terminals or inputted therethrough in a state of preview and differentially offering information on the object according to the calculated degree of interest.

BACKGROUND OF THE INVENTION

Recently, due to the wide spread use of the Internet, it has been common to provide geographical information converted to a digital form which was once offered in a form of printing such as books. A digital map service provided online, a navigation system installed in a vehicle, etc. may be examples. As such, one of benefits of the digitalized geographic information is to provide a variety of convenient functions for users through user interfaces capable of allowing the users to retrieve desired geographic information. Further, changes in the geographic information may be easily updated through remote updating services, etc., so that, in the aspect of latest geographic information, such digital data may be predominant over conventional printed materials.

In special, a technology of providing geographical information in a form of augmented reality (AR) which displays supplementary information, with computer graphics (CG), texts, etc., combined on an inputted image taken in real time by a user terminal has been recently introduced. According to the AR technology, the technology may provide a better environment for a user because it may offer supplementary information which overlaps visually with an inputted image, i.e., an image of the real world the user is watching as being inputted through a camera module of the terminal.

In reality, it is difficult to provide supplementary information on all objects included in an image of small size taken or inputted by the user terminal in use of the augmented reality and it is desirable to differentially provide only the supplementary information on the objects with relatively high degrees of interest (or high degrees of importance).

According to conventional technologies, it is, however, vexatious to passively set degrees of interest in numerous objects existing on a map of a supplementary information providing system. Furthermore, even if a separate method for calculating the degrees of interest is applied to automatically calculating the degrees, it is not highly precise. Therefore, it is difficult to effectively provide the supplementary information on the objects the user wants.

SUMMARY OF THE INVENTION

It is, therefore, an object of the present invention to solve all the problems mentioned above.

It is another object of the present invention to differentially provide supplementary information on an object according to a degree of interest in the object by automatically calculating the degree of interest in the object existing in the real world by referring to respective viewing frustums whose vertexes are visual points of respective user terminals if images are taken by the user terminals.

It is still another object of the present invention to provide the supplementary information on the object on an electronic map appropriate for a situation of a user in a form of augmented reality by referring to the situation information including information on demographic characteristics of the user, information on a time zone, etc.

In accordance with one aspect of the present invention, there is provided a method for providing information on an object by using viewing frustums, including the steps of: (a) specifying at least two viewing frustums whose vertexes are visual points of respective user terminals; and (b) calculating a degree of interest in the object by referring to the object commonly included in both a first viewing frustum whose vertex is a visual point of a first user terminal and a second one whose vertex is a visual point of a second user terminal.

In accordance with one aspect of the present invention, there is provided a system for providing information on an object by using viewing frustums, including: a viewing frustum deciding part for specifying at least two viewing frustums whose vertexes are visual points of respective user terminals; and a viewing frustum analyzing part for calculating a degree of interest in the object by referring to the object commonly included in both a first viewing frustum whose vertex is a visual point of a first user terminal and a second one whose vertex is a visual point of a second user terminal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
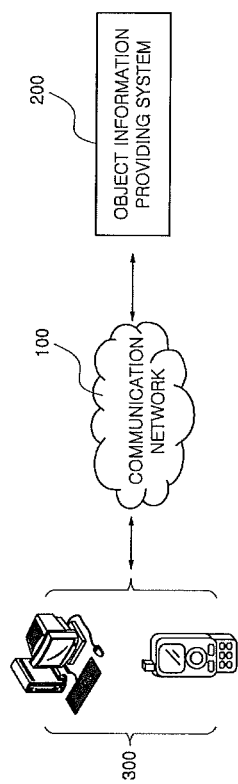
FIG. 1 is a diagram briefly representing a configuration of an entire system to provide information on an object by referring to viewing frustums in accordance with an example embodiment of the present invention.

The detailed description of the present invention illustrates particular embodiments in which the present invention can be performed with reference to the attached drawings.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a viewing frustum indicates a three-dimensional region included in a visual field of a photographing instrument, such as a camera, if an image is taken by the photographing instrument or inputted in a preview state therethrough. It may be specified by a visual point of the photographing instrument and also may be defined as an infinite, region in a shape of a cone or a polypyramid according to types of photographing lenses (or as a finite region in a shape of a trapezoidal cylinder or a trapezoidal hexahedron, etc. created by cutting the cone or the polypyramid by a near plane or a far plane which is vertical to a visual direction, i.e., a direction of a center of lens of the photographing instrument facing the real world which is taken by the lens, the near plane being nearer to the visual point than the far plane) based on the center of the lens serving as the visual point. More specifically, the viewing frustum mentioned herein may be formed to pass through at least part of an object (e.g., a building) existing in the real world and respective viewing frustums which are specified by respective visual points of different user terminals may have a common overlapped region.

Configuration of Entire System

FIG. 1 briefly represents a configuration of an entire system to provide information on an object by referring to viewing frustums in accordance with an example embodiment of the present invention.

As illustrated in FIG. 1, the entire system in accordance with an example embodiment of the present invention may include a communication network 100, an object information providing system 200 and a user terminal 300.

First of all, the communication network 100 may be configured, regardless of wired or wireless, in a variety of networks, including a local area network (LAN), a metropolitan area network (MAN), a wide area network (WAN), etc. More preferably, the communication network 100 in the present invention may be the World Wide Web (www).

In accordance with an example embodiment of the present invention, the object information providing system 200 may perform a function of automatically calculating a degree of interest in the object existing in an image inputted to the terminal by referring to viewing frustums whose vertexes correspond to visual points of the respective user terminals in case the respective images are inputted to the user terminals and differentially providing supplementary information on the object according to the degree of interest in the object.

In accordance with an example embodiment of the present invention, the user terminal 300 may be a digital device which includes a function of allowing the user to access to, and then communicate with, the object information providing system 200. Herein, the digital device, such as a personal computer (e.g., desktop, laptop, etc.), a workstation, a PDA, a web pad, and a cellular phone, which has a memory means and a micro processor with a calculation ability, may be adopted as the terminal 300 in accordance with the present invention.

Configuration of Object Information Providing System

Below is an explanation on an internal configuration and components of the object information providing system 200 which perform their important functions for implementing the present invention.

Figure 2:
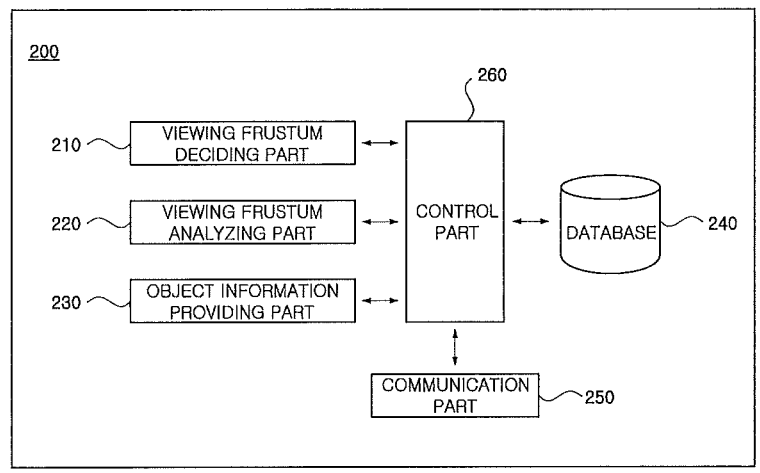
FIG. 2 is a diagram exemplarily illustrating an internal configuration of the object information providing system 200 in accordance with an example embodiment of the present invention.

FIG. 2 exemplarily illustrates an internal configuration of the object information providing system 200 in accordance with an example embodiment of the present invention.

By referring to FIG. 2, the object information providing system 200 in accordance with an example embodiment of the present invention may include a viewing frustum deciding part 210, a viewing frustum analyzing part 220, an object information providing part 230, a database 240, a communication part 250 and a control part 260. In accordance with an example embodiment of the present invention, at least some of the viewing frustum deciding part 210, the viewing frustum analyzing part 220, the object information providing part 230, the database 240, the communication part 250 and the control part 260 may be program modules communicating with the user terminal 300. The program modules may be included in the object information providing system 200 in a form of an operating system, an application program module and other program modules and may also be stored on several memory devices physically. Furthermore, the program modules may be stored on remote memory devices communicable to the object information providing system 200. The program modules may include but not be subject to a routine, a subroutine, a program, an object, a component, and a data structure for executing a specific operation or a type of specific abstract data that will be described in accordance with the present invention.

First, the viewing frustum deciding part 210 in accordance with an example embodiment of the present invention may perform a function of specifying, and storing, viewing frustums whose vertexes are visual points of the respective user terminals 300 if images are taken by the user terminals or inputted in a state of preview therethrough.

In accordance with an example embodiment of the present invention, a user may conduct a meaningful act including taking an image or inputting an image in a state of preview with respect to an object of his or her interest by using his or her user terminal 300 and the viewing frustums specified by the visual points of the respective user terminals 300, therefore, may include the whole or part of the object(s) of interest such as a building, a store or the like.

In accordance with an example embodiment of the present invention, the viewing frustum may be a three-dimensional region defined in three-dimensional space and may be defined as an infinite region in a shape of a cone or a polypyramid whose vertex is a visual point of a terminal and whose height is infinite, wherein a shape of the viewing frustum may depend on a type of a photographing lens embedded in the terminal. If an image is taken with a normal camera lens, it may be defined in a shape of a polypyramid including a quadrangular pyramid, etc. But the shape of the viewing frustum is not limited only to the example embodiments as listed above and the viewing frustum may be defined as a finite region in a shape of a trapezoidal cylinder, a trapezoidal hexahedron or the like cut by a near plane or a far plane which is vertical to a visual direction.

Figure 3:
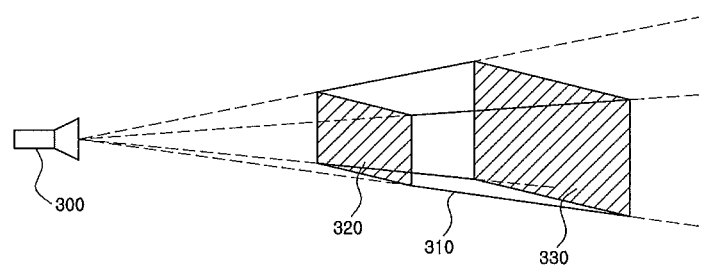
FIG. 3 is a drawing exemplarily showing a form of a viewing frustum in accordance with an example embodiment of the present invention.

FIG. 3 exemplarily illustrates a form of a viewing frustum in accordance with an example embodiment of the present invention.

By referring to FIG. 3, a viewing frustum 310 in accordance with an example embodiment of the present invention may have a vertex corresponding to the visual point of the user terminal 300 and may be defined as a finite region divided by a near plane 320 and a far plane 330 under a perspective projection. Herein, a distance between the visual point and the near plane 320 and that between the visual point and the far plane 330 may be set consistently in all viewing frustums or set adaptively according to an object which is taken. For example, if the object is a building, the former distance and the latter distance may be set to be 10 meters and 5000 meters, respectively, to make the building completely included in the viewing frustum. As explained above, it will be a matter of course that the viewing frustum may be defined to be an infinite region by setting a distance to the far plane 330 to be infinite.

In accordance with an example embodiment of the present invention, a location and a direction of the viewing frustum may be decided by referring to a location and a direction of the user terminal 300. In other words, the location and the direction of the viewing frustum whose vertex is a visual point of the user terminal 300 may be specified by those of the user terminal 300 in three-dimensional space on a map. Herein, information on the location and the direction of the user terminal 300 may be obtained by a global positioning system (GPS) module and an accelerometer means.

In accordance with an example embodiment of the present invention, if a user takes a video by using the user terminal 300, the location and the direction of the user terminal 300 may be changed moment by moment by a movement, an operation, or the like of the user and thereby the location and the direction of the viewing frustum may be changed every moment. In the case, respective viewing frustums may be specified from multiple frames which form the video.

Furthermore, the viewing frustum deciding part 210 in accordance with an example embodiment of the present invention may perform a function of acquiring information on a situation when a viewing frustum is specified. Herein, the information on the situation of the viewing frustum may include a time zone when the viewing frustum was specified or demographic information such as gender, age, etc. of a user of a user terminal whose visual point corresponds to the vertex of the viewing frustum, etc. Such situation information may be used to allow the object information providing part 230 to provide information on an object customized to the user. The object information providing part 230 will be explained later.

Next, the viewing frustum analyzing part 220 in accordance with an example embodiment of the present invention may conduct a function of calculating degrees of interest in objects existing in the real world by analyzing the multiple viewing frustums specified from the multiple user terminals 300.

More specifically, the viewing frustum analyzing part 220 in accordance with an example embodiment of the present invention may calculate a common region which is overlapped by at least two viewing frustums in three-dimensional space on a map by referring to the respective locations and the respective directions of the viewing frustums and may determine an object included in the calculated common region to have a high degree of interest of users.

Figure 4:
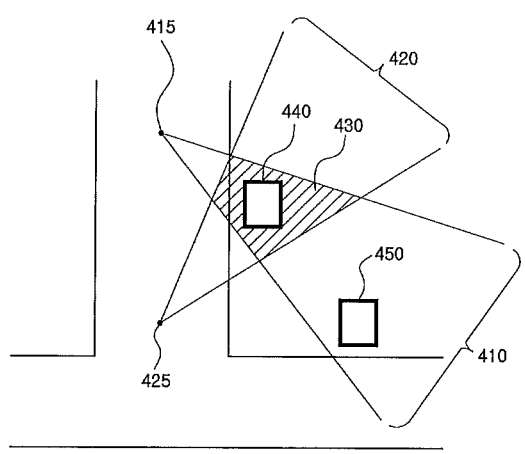
FIG. 4 is a drawing exemplarily illustrating a location relationship between the viewing frustums and the object in accordance with an example embodiment of the present invention.

FIG. 4 is a diagram exemplarily illustrating location relationships between viewing frustums and objects. For reference, it is assumed in FIG. 4 that a first viewing frustum 410 and a second one 420 are infinite regions in a shape of a quadrangular pyramid as viewing frustums whose vertexes are different points 415 and 425 respectively.

By referring to FIG. 4, a common region 430 as a region overlapped between the first viewing frustum 410 and the second one 420, which are specified in three dimensional space on the map, may exist and the common region 430 may be evaluated as a region of interest of a first and a second users all who specify the first and the second viewing frustums 410 and 420 respectively by taking a video or a photo in use of their respective user terminals. Accordingly, if an object A 440 is included in a common region 430 and an object B 450 is included only in a region of the first viewing frustum 410, the viewing frustum analyzing part 220 in accordance with an example embodiment of the present invention may decide the object A 440 as an object with a high degree of interest of the first and the second users and the object B 450 as an object with a high degree of interest of the first user only. As a result, the viewing frustum analyzing part 220 may determine that the degree of interest in the object A 440 is higher than that in the object B 450. In the context, if a common region is crossed and overlapped for more times by different viewing frustums, the viewing frustum analyzing part 220 in accordance with an example embodiment of the present invention may decide the degree of interest in an object located in the common region to be higher.

Furthermore, if a distance between an object located in a viewing frustum and a visual point thereof, i.e., a vertex of the viewing frustum, is closer, the viewing frustum analyzing part 220 in accordance with an example embodiment of the present invention may determine a degree of interest in the object to be higher and if a region occupied by the object in the common region is larger, it may decide the degree of interest in the object to be higher.

On the other hand, if a visual field of a viewing frustum is narrow or a distance from a visual point of a viewing frustum to an object included in the viewing frustum is too short, the different viewing frustums may not be overlapped even though they are stretched toward the same object. For example, a viewing frustum, which is specified if an upper part of a façade of a 300 meter-high building B is taken on a street only 10 meters far from the building B, and another viewing frustum, which is specified if a lower part of a side of the building B is taken, are stretched toward the building B but the viewing frustums do not have a common region overlapped with each other.

Hereupon, even if there does not exist any common region overlapped by viewing frustums, the viewing frustum analyzing part 220 in accordance with an example embodiment of the present invention may perform a function of recognizing an identity of an object whose part or whole is included in the viewing frustums by referring to locations or directions of the viewing frustums or by using an object recognition technology; and if a specific object is recognized to be included, respectively, in different viewing frustums as a result, it may perform a function of determining the specific object to have a degree of interest as if it were included in the common region overlapped by the viewing frustums. More specifically, a method for recognizing the object in three-dimensional space on the map may be applicable by referring to a location and a direction of the viewing frustum through a global positioning system (GPS) module, an accelerometer means, etc. or a method for recognizing the object may also be applicable by analyzing an appearance (a contour, a pattern, etc.) of the object appearing in an inputted image corresponding to the viewing frustum as a method for recognizing the object included in the viewing frustum.

In accordance with an example embodiment of the present invention, the object information providing part 230 may conduct a function of providing supplementary information on at least one object differentially by referring to degree(s) of interest in object(s) calculated by the viewing frustum analyzing part 220.

More concretely, the object information providing part 230 in accordance with an example embodiment of the present invention may provide the supplementary information on a point of interest (POI) displayed in a form of augmented reality. In the case, it may provide only the supplementary information on an object(s) in which degree(s) of interest exceeds a prefixed level or allow a size of a visual indicator(s), such as an icon(s) indicating the object(s) to be displayed differentially according to the degree(s) of interest therein.

For instance, it may be assumed that a user B near Yeoksam subway station receives supplementary information on an object in a form of augmented reality by using a user terminal with a photographing instrument. In the case, while selectively receiving the supplementary information only on "Gangnam Finance Tower" determined to be an object that multiple users have high degrees of interest in, the user B may not get the supplementary information on "Sungji Heights Building" determined to be an object with a low degree of interest. The user B, hereby, will be able to receive only more useful information by the user's taste.

In addition, the object information providing part 230 in accordance with an example embodiment of the present invention may perform a function of providing supplementary information only on an object corresponding to a situation of a user who wants to receive the supplementary information by referring to information on a situation of a viewing frustum. As explained above, the situation information on the viewing frustum may include a time zone when the viewing frustum was specified or demographic information such as gender, age, etc. of a user of a terminal whose visual point is the vertex of the viewing frustum, etc.

For example, it may be assumed that a user C who is a 20-something woman receives information in a daytime. In the case, the object information providing part 230 in accordance with an example embodiment of the present invention may provide supplementary information only on an object (e.g., a department store, a coffee shop, etc.) fit for the situation of the user C by referring to degrees of interest in objects calculated only in use of viewing frustums specified in a day time by other 20-something female users.

The aforementioned example embodiments mainly have explained the viewing frustums defined in three-dimensional space on the map but the viewing frustums in accordance with the present invention are not limited only to the aforementioned example embodiments. In accordance with an example embodiment of the present invention, the viewing frustum analyzing part 220 may project viewing frustums specified in three-dimensional space onto two-dimensional space on a map and calculate a degree of interest(s) in an object(s) by referring to a common region overlapped by at least two different projected regions.

The database 240 in accordance with an example embodiment of the present invention may store information on a shape, a near plane, a far plane, a location, a direction, etc. of at least one viewing frustum whose vertex is a visual point of at least one user terminal and each viewing frustum with its related situation information may also be stored on the database. Herein, the situation information connected with the viewing frustum stored on the database may include a time zone when the viewing frustum was specified, demographic information such as gender, age or the like of a user of a terminal whose visual point is the vertex of the viewing frustum, etc.

In accordance with the present invention, the database is a concept of a database not only in a narrow meaning but also in a broad meaning which include data records, etc. based on computer file systems. From the aspect, it must be understood that, even a set of simple operation processing logs may be the database(s) in the present invention if data can be extracted from the set. In addition, the database 240 in FIG. 2 is illustrated to be configured inclusively in the object information providing system 200 but the database 240 may be configured separately from it by those skilled in the art.

The communication part 250 in accordance with an example embodiment of the present invention may perform a function of instructing the object information providing system 200 to communicate with an external device such as the user terminal 300.

In accordance with an example embodiment of the present invention, the control part 260 may perform a function of controlling data flow among the viewing frustum deciding part 210, the viewing frustum analyzing part 220, the object information providing part 230, the database 240 and the communication part 250. In short, the control part 260 may control the flow of data from outside or among the components of the object information providing system 200 and thereby allow the viewing frustum deciding part 210, the viewing frustum analyzing part 220, the object information providing part 230, the database 240 and the communication part 250 to perform their unique functions.

In accordance with the present invention, the supplementary information on the objects that users have much interest in can be provided effectively for other users because the degrees of interest in the objects in real world may be automatically calculated by referring to the viewing frustums and the supplementary information on the objects may be provided differentially according to the calculated degrees of interest.

Since the supplementary information on the objects fit for the situation of the user (e.g., the supplementary information on a building with a high degree of interest of 30-something men or on a store with a high degree of interest in a day time, etc.) is provided, the supplementary information on the objects that users are likely to be interested in may be effectively provided by subdividing types of the users.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method comprising the steps of:
   specifying, by a processor, a first viewing frustum having a visual point of a first user terminal as first vertex;
   specifying a second viewing frustum having a visual point of a second user terminal as second vertex;
   calculating a degree of interest in an object by determining that the object is commonly included in both the first viewing frustum and a the second viewing frustum;
   recognizing an identity of the object based on GPS (Global Positioning System) coordinates including locations and viewing directions of the first and second viewing frustums; and
   providing supplementary information on the recognized object if the object has a high calculated degree of interest.

2. The method of claim 1, wherein the viewing frustums are regions included in visual fields of the user terminals if images are taken by the user terminals or images are inputted through the user terminals in a state of preview.

3. The method of claim 1, wherein the viewing frustums are each in shapes of infinite cones or infinite polypyramids whose vertexes correspond to the visual points, or are in shapes of trapezoidal cylinders or trapezoidal polyhedrons created by cutting the cones or the polypyramids by one or two planes perpendicular to the axis of the infinite cones or the infinite polypyramids.

4. The method of claim 1, wherein locations and directions of the viewing frustums are determined by referring to those of the user terminals.

5. The method of claim 1, wherein, the degree of interest in the object is calculated by referring to a common region overlapped by the first and the second viewing frustums.

6. The method of claim 5, wherein at least part of the object is included in the common region, the degree of interest in the object is determined to be higher than that in a certain object not included therein.

7. The method of claim 5, wherein as the object occupies a larger portion of the common region, the degree of interest in the object is determined to be higher.

8. The method of claim 1, wherein a higher number of viewing frustums that commonly include the object generates a higher degree of interest in the object.

9. The method of claim 1, wherein as the object becomes nearer from the visual point of the viewing frustum, a degree of interest in the object is determined to be higher.

10. The method of claim 1, wherein at least a part of each of a first and a second object included in the first and the second viewing frustums are recognized to be identical with each other, a degree of interest in the same object is calculated.

11. The method of claim 1, wherein calculating a degree of interest in the object includes the steps of:
    acquiring a first and a second projected regions by projecting the first and the second viewing frustums onto two-dimensional space on a map; and
    calculating the degree of interest in the object by referring to the object commonly included in the first and the second projected regions in the two-dimensional space on the map.

12. The method of claim 1, further comprising the step of:
    providing supplementary information on the object differentially according to the calculated degree of interest.

13. The method of claim 12, wherein the supplementary information is provided only on a specific object whose calculated degree of interest exceeds a prefixed threshold value.

14. The method of claim 12, wherein the supplementary information is provided in a form of augmented reality (AR).

15. The method of claim 12, wherein the supplementary information on a specific object targeted under a situation of a third user is provided by referring to situation information on the viewing frustums and situation information of the third user who receives the supplementary information.

16. The method of claim 15, wherein the situation information on the viewing frustums include at least a piece of a time zone when the viewing frustums were specified and demographic information on users of user terminals whose visual points are vertexes of the viewing frustums and the situation information on the third user includes at least a piece of a place where the third user receives the supplementary information, a time zone when the third user receives the supplementary information and demographic information on the third user.

17. A medium recording a non-transitory computer readable program to execute the method of claim 1.

18. A system for providing information on an object by using viewing frustums, comprising:
    a viewing frustum deciding part for specifying a first viewing frustum having a visual point of a first user terminal as first vertex and a second viewing frustum having a visual point of a second user terminal as second vertex; and
    a viewing frustum analyzing part for calculating a degree of interest in the object by determining that the object is commonly included in both the first viewing frustum and the second viewing frustum,
    recognizing an identity of the object based on GPS (Global Positioning System) coordinates including locations and viewing directions of the first and second viewing frustums; and
    providing supplementary information on the recognized object if the object has a high calculated degree of interest.

19. The system of claim 18, wherein the viewing frustums are regions included in visual fields of the user terminals if images are taken by the user terminals or images are inputted through the user terminals in a state of preview.

20. The system of claim 18, wherein the viewing frustums are each in shapes of infinite cones or infinite polypyramids whose vertexes correspond to the visual points, or are in shapes of trapezoidal cylinders or trapezoidal polyhedrons created by cutting the cones or the polypyramids by one or two planes perpendicular to the axis of the infinite cones or the infinite polypyramids.

21. The system of claim 18, wherein locations and directions of the viewing frustums are determined by referring to those of the user terminals.

22. The system of claim 18, wherein the viewing frustum analyzing part calculates the degree of interest in the object by referring to a common region overlapped by the first and the second viewing frustums.

23. The system of claim 22, wherein the viewing frustum analyzing part determines the degree of interest in the object, if at least part of the object is included in the common region, to be higher than that in a certain object not included therein.

24. The system of claim 22, wherein, as the object occupies a larger portion of the common region, the viewing frustum analyzing part determines the degree of interest in the object to be higher.

25. The system of claim 18, wherein, a higher if the number of viewing frustums that commonly include the object is more increased, the viewing frustum analyzing part determines the degree of interest in the object to be higher.

26. The system of claim 18, wherein, as the object becomes nearer from the visual point of the viewing frustum, the viewing frustum analyzing part determines the degree of interest in the object to be higher.

27. The system of claim 18, wherein, where at least a part of each of a first and a second objects included in the first and the second viewing frustums are recognized to be identical with each other, the viewing frustum analyzing part calculates a degree of interest in the object.

28. The system of claim 18, wherein the viewing frustum analyzing part acquires a first and a second projected regions by projecting the first and the second viewing frustums onto two-dimensional space on a map and calculates the degree of interest in the object by referring to the object commonly included in the first and the second projected regions in the two-dimensional space on the map.

29. The system of claim 18, further comprising an object information providing part for providing supplementary information on the object differentially according to the calculated degree of interest.

30. The system of claim 29, wherein the object information providing part provides the supplementary information only on a specific object whose calculated degree of interest exceeds a prefixed threshold value.

31. The system of claim 29, wherein the supplementary information is provided in a form of augmented reality (AR).

32. The system of claim 29, wherein the object information providing part provides the supplementary information on a specific object targeted under a situation of a third user by referring to situation information on the viewing frustums and situation information of the third user who receives the supplementary information.

33. The system of claim 32, wherein the situation information on the viewing frustums include at least a piece of a time zone when the viewing frustums were specified and demographic information on users of user terminals whose visual points are vertexes of the viewing frustums; and the situation information on the third user includes at least a piece of a place where the third user receives the supplementary information, a time zone when the third user receives the supplementary information and demographic information on the third user.

\* \* \* \* \*